JOHNSON & LEWIS.
Churn.
No. 5,561. Patented May 9, 1848.
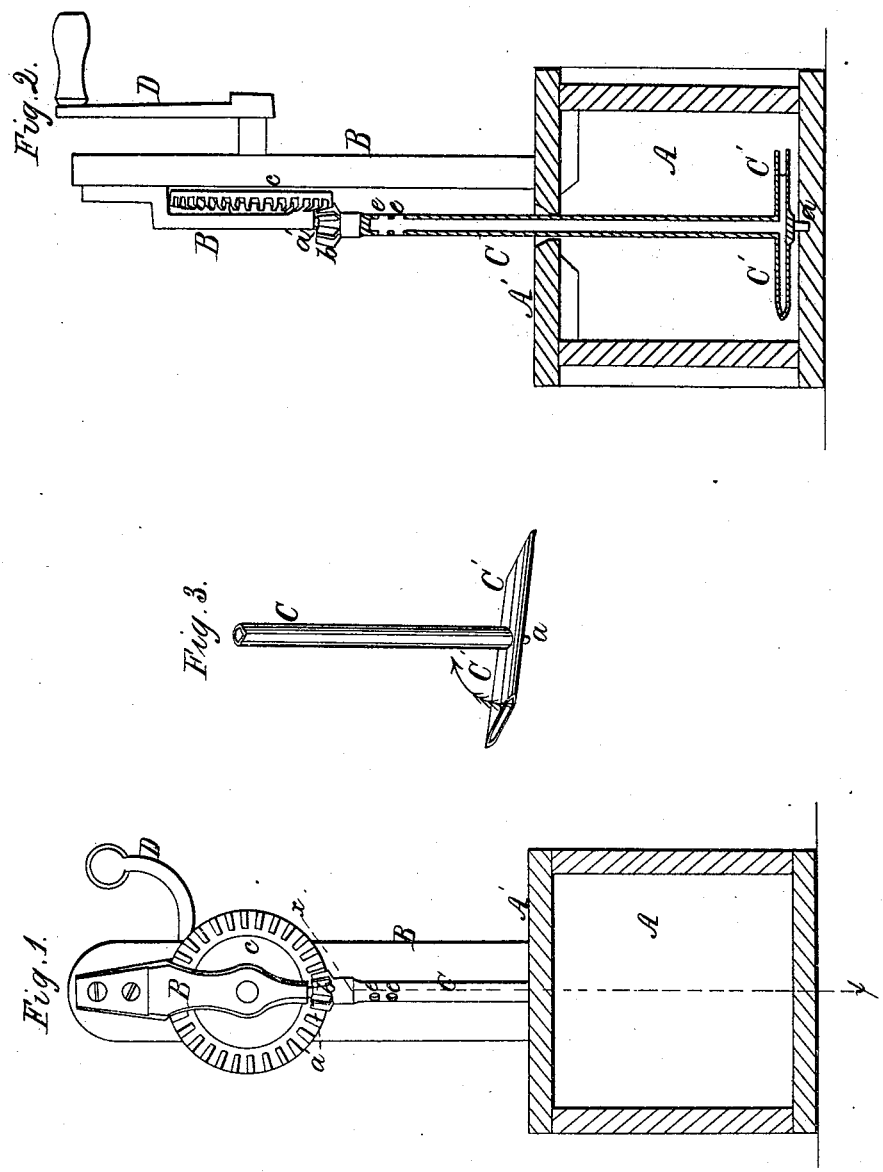

UNITED STATES PATENT OFFICE.

WILLIS H. JOHNSON AND THOMAS LEWIS, OF SPRINGFIELD, ILLINOIS.

ATMOSPHERIC CHURN.

Specification of Letters Patent No. 5,561, dated May 9, 1848.

*To all whom it may concern:*

Be it known that we, WILLIS H. JOHNSON and THOMAS LEWIS, of Springfield, Sangamon county, in the State of Illinois, have invented certain new and useful Improvements in Churns, of which the following is a full, clear, and exact description, reference being had to the annexed drawings of the same, making part of this specification, of which—

Figure 1 is a front elevation of the churn. Fig. 2 is a section through the line $x\ x$ of Fig. 1. Fig. 3 is a perspective view of the lower part of the dasher.

The same letters in the different figures refer to corresponding parts of the machine.

The nature of my invention and improvement consists in a new combination and arrangement of known mechanical devices whereby cream is churned by mixing a stream of atmospheric air with it at the same time that it is subjected to agitation by a revolving dasher in the usual way.

To enable others skilled in the art to make and use my invention I will proceed to describe its construction and operation. The churn may be made of any convenient form and of any suitable material, the vessel A or body of the churn to contain the cream has a step in its bottom in which the gudgeon $a$ of the revolving dasher is placed. Through the movable cover A′ an aperture is made for the vertical shaft of the dasher to pass through the gudgeon $a'$ of the upper end of the vertical shaft C turns in a suitable bearing formed in the frame B; on the upper end of this shaft a pinion $b$ is mounted which gears into the wheel $c$, the wheel is turned by the winch D secured to the end of its axis. The shaft C is hollow, having holes $e\ e$ near its upper end for the admission of atmospheric air which passes down through the hollow arms C′ C′ which communicate with it. The arms C′ C′ project from opposite sides of the lower end of the vertical shaft and their ends are sloped off obliquely as represented in order that when turned in the direction indicated by the arrow Fig. 3 a partial vacuum may be formed behind them in the cream into which the air may rush unobstructed from the hollow arms; it is manifest, that if the arms were turned in the opposite direction the cream would run into and choke up the apertures so that the air could not escape freely from them to mingle with the cream. To operate the churn the attendant lays hold of the winch and turns it, which revolves the wheel $c$ and the pinion $b$ which gears into it, together with its shaft C and the arms C′, C′. In consequence of the pinion being much smaller than the wheel the arms are revolved rapidly which produces an active and thorough agitation of the cream and at the same time the air is discharged from the ends of the arms into the partial vacuum formed behind them from whence in consequence of its levity it ascends to the surface of the cream in numerous small bubbles, being thus diffused throughout its entire mass. Thus by the combined action of the revolving dashers and the bubbling or effervescence produced by the ascending air, the cream is more thoroughly agitated and every particle of it is more effectually mixed and brought into contact with the air; consequently the butter is sooner formed than by any other known churning machine; and in addition to the superiority of my machine over others in the particulars before enumerated it possesses the merit of being operated with less force.

What we claim as our invention and desire to secure by Letters Patent is—

The process of making butter by the combined action of the hollow rotary shaft and radial arms as aforesaid, the arms agitating the cream and diffusing the air through the same simultaneously as herein set forth.

In testimony whereof we have hereunto signed our names in presence of two subscribing witnesses this twenty sixth day of November A. D. 1847.

WILLIS H. JOHNSON.
THOMAS LEWIS.

Witnesses:
THOMAS MOFFETT,
HENRY H. BROWN.